Oct. 9, 1962  J. W. SIDWELL  3,057,074
AUTOMOBILE AND TRUCK FRAME BODY ALIGNMENT GAUGES
Filed July 2, 1959
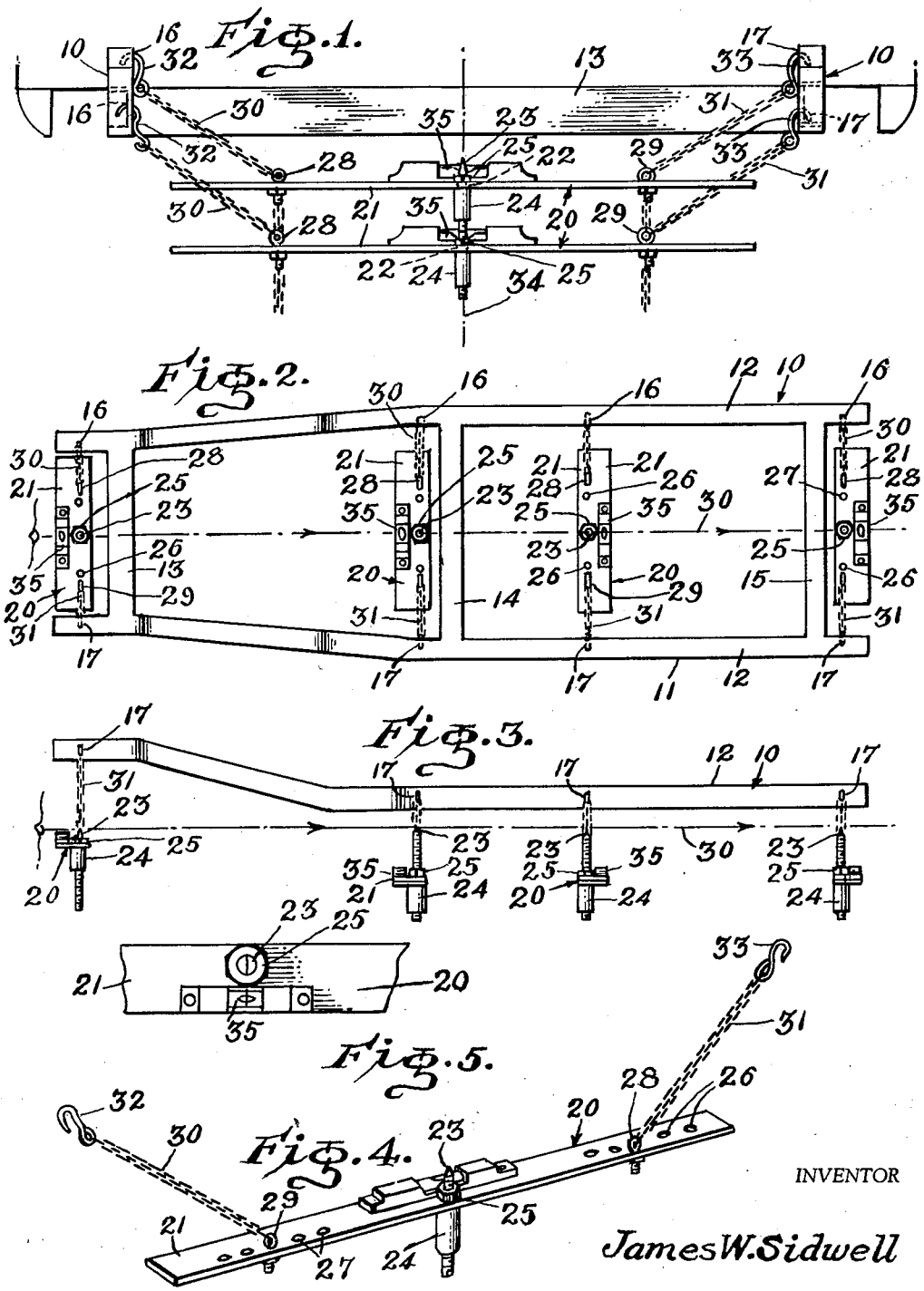
INVENTOR
James W. Sidwell

United States Patent Office 3,057,074
Patented Oct. 9, 1962

3,057,074
AUTOMOBILE AND TRUCK FRAME BODY
ALIGNMENT GAUGES
James W. Sidwell, 398 Filer Ave. W., Twin Falls, Idaho
Filed July 2, 1959, Ser. No. 824,688
2 Claims. (Cl. 33—191)

This invention relates to automobile and truck frame and body alignment gauges.

It is the principal object of the present invention to provide an inexpensive vehicle frame and body alignment gauge which can be easily attached to a vehicle frame or body to determine whether or not the body has become out of alignment, if it has, the extent thereof, and indicate how it may be repaired.

It is another object of the invention to provide gauges which are not of rigid construction and which cannot be easily damaged by bumping or other abuse.

It is another object of the invention to provide a suspended frame and body alignment gauge with an adjustable pointer for comparison of the pointers of several gauges suspended from the vehicle frame with a center line.

Other objects of the invention are to provide a vehicle frame and body alignment gauge having the above features which is of simple construction, has a minimum number of parts, inexpensive to manufacture, easy to use, easy to adjust, light in weight, durable, efficient and effective in use.

For a better understanding of the invention, reference may be had to the following detailed description taken in connection with the accompanying drawing, in which FIGURE 1 is an enlarged front end elevational view of a vehicle frame with the frame and body alignment gauges of the present invention suspended therefrom, FIG. 2 is a top plan view of a vehicle frame and of four such gauges suspended therefrom, FIG. 3 is a side elevational view of the vehicle frame and of the gauges, FIG. 4 is a perspective view of one of the gauges, and FIG. 5 is an enlarged fragmentary plan view of the center of the gauge about the pointer.

Referring now to the figures, 10 represents a vehicle frame having longitudinally extending sides 11 and 12 and transverse members 13, 14 and 15. In the sides 11 and 12, longitudinally spaced from one another are holes 16 and 17 convenient to receive hooks 32 and 33 of the frame and body alignment gauge 20 of the present invention. The holes are transversely aligned with one another and are located at the forward, intermediate and rear portions of the frame. The gauges 20 are suspended across the vehicle frame parallel to the transverse members 13, 14 and 15. Each gauge has a horizontal flat bar 21 with a vertical hole 22 extending through the middle of the bar and equidistant from each end. A pointer 23 in the form of a round rod extends through this hole at a right angle to the bar and is adjustable therein for different elevations. The pointer 23 is threaded and is held in its adjusted position by a threaded depending sleeve 24 and a lock nut 25. The sleeve 24 is brought into engagement with the bottom face of the bar while the lock nut 25 is brought into engagement with the top face of the bar so that the pointer rod 23 will be held rigid and in its proper elevated position.

The bar 21 has a plurality of adjusting holes 26 at one end and 27 at the opposite end adapted to respectively receive screw eyes 28 and 29. Connected respectively to the screw eyes 28 and 29 are chains 30 and 31 having attaching hooks 32 and 33 adapted to be connected into holes 16 and 17 in the frame sides 11 and 12 for support of the gauge thereunder. The gauge is designed so that the effective length between symmetrical pairs of holes 26 and 27 may be changed so that the gauge can be suspended at the desired elevation to maintain a small angle between the chains 30 and 31 and the bar 21. The number of chain links used and adjustment holes 26 and 27 used are symmetrical about the pointer so that the pointer will come close to the line 34 of observation, for a properly aligned frame.

The lengths of the chains are adjusted so that they will subtend an angle of less than forty-five degrees relative to the bar 21 regardless of the distance between the points of attachment to the sides of the vehicle frame and the pointer will indicate the vertical center line between them. The reason for selecting this angle is to make the pointer more sensitive to vertical misalignment of the chain support holes in the frame or body members.

Several of these gauges are suspended from the frame. The vehicle is blocked up from the floor and leveled. Each gauge is suspended from pairs of holes in the frame symmetrical about the frame longitudinal center line. After the frame is properly leveled, the pointed ends of the pointers should be aligned along the center line 34 as viewed from the forward or rear end of the vehicle. Any deviation of the pointers from the center line 34 indicates that the frame will need corrective repair. A level gauge 35 is provided on each horizontal bar 21 next to the pointer 23 to determine whether or not the bars are substantially horizontal. If the pointers appear, from sighting along the center line, to be in a common fore and aft vertical plane it can be assumed that the frame is symmetrical about its fore and aft center line.

If the horizontal bars appear to be parallel to each other, then it can be assumed that the vehicle frame is in a normal horizontal alignment. If there is a deviation of the pointers from a vertical plane along the center line or if the horizontal bars are not parallel, it can be assumed that the vehicle frame is not in exact alignment and that corrective repair should be undertaken to correct the misalignment. The gauges can be used while the repair man is making the repair of the frame so that the frame can be checked at all times while this corrective procedure is being carried out.

It shall, of course, be understood that various departures from the structure disclosed herein may be made without departing from the spirit of this invention or being outside of the scope of the appended claims.

What is claimed is:

1. A vehicle frame and body alignment gauge comprising a horizontal bar having a central vertical opening equidistant from the ends thereof, a vertical pointer rod and means for adjustably securing said pointer rod in said opening, equal length chain devices connected respectively to said horizontal bar at the opposite sides of the pointer equidistant therefrom and adapted to support the gauge between two points on the vehicle frame or body, and said chain devices having means for attaching one end of said chains to the vehicle frame or body, said horizontal bar having a series of holes at each end thereof and symmetrical about the center hole, and means at the opposite ends of said chains for connecting the chains in said holes in the horizontal bar.

2. An assembly for gauging vehicle frame alignment comprising a plurality of horizontal bars, each bar including a centrally disposed vertical pointer, and equal length flexible members extending outwardly and upwardly from the bar, each having means on one end for detachable supporting engagement with a frame to be gauged, means connecting the inner ends of said flexible members to the bar at points equidistant from the pointer whereby all the pointers will assume a vertical position on the frame centerline and all the bars will be parallel when the frame has not been deformed, said means connecting the inner ends of the flexible members to the bars including a plurality of longitudinally spaced apertures in each end of each bar, said apertures being spaced equally from the pointer, and means to connect said flexible members at one of the apertures at each side of the central pointer.

References Cited in the file of this patent

UNITED STATES PATENTS

| | | |
|---|---|---|
| 2,401,980 | Smith | June 11, 1946 |
| 2,525,582 | Bissell | Oct. 10, 1950 |
| 2,581,021 | Jacobsen et al. | Jan. 1, 1952 |
| 2,680,302 | Standal | June 8, 1954 |
| 2,694,813 | Cartwright et al. | Nov. 23, 1954 |